(12) United States Patent
Leemhuis et al.

(10) Patent No.: US 9,031,424 B2
(45) Date of Patent: May 12, 2015

(54) SYSTEMS AND METHODS FOR MEASURING A PARTICULATE MATERIAL

(71) Applicant: Lexmark International, Inc., Lexington, KY (US)

(72) Inventors: Michael Craig Leemhuis, Nicholasville, KY (US); Jeffrey Alan Abler, Georgetown, KY (US); Daniel Steinberg, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 144 days.

(21) Appl. No.: 13/717,923

(22) Filed: Dec. 18, 2012

(65) Prior Publication Data

US 2014/0169807 A1    Jun. 19, 2014

(51) Int. Cl.
| | |
|---|---|
| *G03G 15/08* | (2006.01) |
| *G03G 13/08* | (2006.01) |
| *G01F 23/00* | (2006.01) |

(52) U.S. Cl.
CPC ............ *G03G 13/08* (2013.01); *G03G 15/0858* (2013.01); *G03G 15/0879* (2013.01); *G03G 2215/0132* (2013.01); *G03G 2215/085* (2013.01); *G01F 23/003* (2013.01)

(58) Field of Classification Search
CPC .......... G03G 15/0856; G03G 15/0858; G03G 15/086; G03G 15/0822; G03G 2215/0888; G03G 2215/0891; G03G 2215/0894
See application file for complete search history.

(56) References Cited

U.S. PATENT DOCUMENTS

| | | | | |
|---|---|---|---|---|
| 4,506,804 | A | | 3/1985 | Oka |
| 4,989,754 | A | * | 2/1991 | Grasso et al. .................... 222/39 |
| 5,111,247 | A | | 5/1992 | Nichols |
| 5,216,462 | A | * | 6/1993 | Nakajima et al. ............... 399/27 |
| 5,436,704 | A | | 7/1995 | Moon |
| 5,634,169 | A | * | 5/1997 | Barry et al. ...................... 399/12 |
| 5,995,772 | A | | 11/1999 | Barry et al. |
| 6,032,004 | A | | 2/2000 | Mirabella, Jr. et al. |
| 6,100,601 | A | | 8/2000 | Baker et al. |

(Continued)

FOREIGN PATENT DOCUMENTS

| | | |
|---|---|---|
| JP | 3351179 B2 | 11/2002 |
| WO | 2012144324 A1 | 10/2012 |

OTHER PUBLICATIONS

International Search Report and Written Opinion of the International Searching Authority for PCT Application No. PCT/US2013/075569 dated Apr. 23, 2014.

(Continued)

*Primary Examiner* — Clayton E Laballe
*Assistant Examiner* — Victor Verbitsky
(74) *Attorney, Agent, or Firm* — Justin M Tromp

(57) ABSTRACT

A system for measuring a particulate material according to one example embodiment includes a container having a reservoir for storing the particulate material. A rotatable shaft is positioned within the reservoir. A paddle is mounted on the shaft and rotatable independent of the shaft. A driving member is rotatable with the shaft and positioned to push the paddle when the shaft rotates. The paddle is free to fall ahead of the driving member. At least one sensor is positioned to sense a rotational motion of the paddle as the shaft rotates. A processor in electronic communication with the at least one sensor is configured to determine an amount of the particulate material remaining in the reservoir based on the sensed rotational motion of the paddle.

18 Claims, 10 Drawing Sheets

(56) References Cited

U.S. PATENT DOCUMENTS

| | | |
|---|---|---|
| 6,246,841 B1 | 6/2001 | Merrifield et al. |
| 6,336,015 B1 | 1/2002 | Numagami |
| 6,343,883 B1 | 2/2002 | Tada et al. |
| 6,459,876 B1 | 10/2002 | Buchanan et al. |
| 6,496,662 B1 | 12/2002 | Buchanan et al. |
| 6,510,291 B2 | 1/2003 | Campbell et al. |
| 6,546,213 B2 | 4/2003 | Ito et al. |
| 6,580,881 B2 | 6/2003 | Coriale et al. |
| 6,600,882 B1 | 7/2003 | Applegate et al. |
| 6,654,569 B2 | 11/2003 | Nozawa |
| 6,718,147 B1 | 4/2004 | Carter et al. |
| 6,819,884 B1 | 11/2004 | True et al. |
| 7,103,308 B2 | 9/2006 | Wakana |
| 7,139,505 B2 | 11/2006 | Askren et al. |
| 7,177,567 B2 | 2/2007 | Miller |
| 7,187,876 B2 | 3/2007 | Ito et al. |
| 7,231,153 B2 | 6/2007 | May |
| 7,248,806 B2 * | 7/2007 | Askren et al. .................. 399/27 |
| 7,399,074 B2 | 7/2008 | Aldrich et al. |
| 7,551,862 B2 | 6/2009 | Tanaka et al. |
| 7,555,231 B2 | 6/2009 | Etter et al. |
| 7,782,198 B2 | 8/2010 | Crockett et al. |
| 8,208,836 B2 | 6/2012 | Shimomura |
| 2002/0091413 A1 | 7/2002 | Cappa et al. |
| 2002/0168192 A1 | 11/2002 | Surya et al. |
| 2006/0291910 A1 | 12/2006 | Choi et al. |
| 2007/0196137 A1 | 8/2007 | Hebner et al. |
| 2008/0226351 A1 | 9/2008 | Dawson et al. |
| 2009/0185833 A1 | 7/2009 | Shimomura |
| 2010/0202798 A1 | 8/2010 | Suzuki et al. |
| 2010/0303484 A1 | 12/2010 | Hogan et al. |
| 2012/0045224 A1 | 2/2012 | Amann et al. |
| 2012/0070162 A1 | 3/2012 | Barry |
| 2012/0099900 A1 | 4/2012 | Noguchi et al. |
| 2012/0170948 A1 | 7/2012 | Kwon et al. |
| 2013/0004208 A1 | 1/2013 | Shimomura |
| 2013/0039670 A1 | 2/2013 | Hosoya et al. |
| 2013/0202275 A1 | 8/2013 | Brown et al. |
| 2014/0029960 A1 | 1/2014 | Ahne et al. |

OTHER PUBLICATIONS

International Search Report and Written Opinion of the International Searching Authority for PCT Application No. PCT/US2013/075573 dated Apr. 23, 2014.
International Search Report and Written Opinion of the International Searching Authority for PCT Application No. PCT/US2013/075575 dated Apr. 16, 2014.
Prosecution history of U.S. Appl. No. 13/717,908 including Notice of Allowance dated Apr. 11, 2014.
U.S. Appl. No. 14/013,457, filed Aug. 29, 2013.
U.S. Appl. No. 14/107,487, filed Dec. 16, 2013.
U.S. Appl. No. 13/717,908, filed Dec. 18, 2012.
U.S. Appl. No. 13/340,789, filed Dec. 30, 2011.
U.S. Appl. No. 13/432,693, filed Mar. 28, 2012.
U.S. Appl. No. 13/617,521, filed Sep. 14, 2012.
Prosecution history of U.S. Appl. No. 13/717,908 including Non-Final Office Action dated Jul. 18, 2014.
Prosecution history of U.S. Appl. No. 13/717,908 including Notice of Allowance dated Nov. 14, 2014.
Prosecution history of U.S. Appl. No. 13/013,457 including Non-Final Office Action dated Feb. 5, 2015.
Prosecution history of U.S. Appl. No. 14/107,487 including Notice of Allowance dated Feb. 11, 2015.

* cited by examiner

SYSTEMS AND METHODS FOR MEASURING A PARTICULATE MATERIAL

CROSS REFERENCES TO RELATED APPLICATIONS

None.

BACKGROUND

1. Field of the Disclosure

The present disclosure relates generally to systems and methods for measuring a particulate material and more particularly to systems and methods for measuring toner.

2. Description of the Related Art

During the electrophotographic printing process, an electrically charged rotating photoconductive drum is selectively exposed to a laser beam. The areas of the photoconductive drum exposed to the laser beam are discharged creating an electrostatic latent image of a page to be printed on the photoconductive drum. Toner particles are then electrostatically picked up by the latent image on the photoconductive drum creating a toned image on the drum. The toned image is transferred to the print media (e.g., paper) either directly by the photoconductive drum or indirectly by an intermediate transfer member. The toner is then fused to the media using heat and pressure to complete the print.

The image forming device's toner supply is typically stored in one or more replaceable units installed in the image forming device. As these replaceable units run out of toner, the units must be replaced or refilled in order to continue printing. As a result, it is desired to measure the amount of toner remaining in these units in order to warn the user that one of the replaceable units is near an empty state or to prevent printing after one of the units is empty in order to prevent damage to the image forming device. Accordingly, a system for measuring the amount of toner remaining in a replaceable unit of an image forming device is desired.

SUMMARY

A method for measuring a particulate material in a reservoir holding the particulate material according to one example embodiment includes rotating a shaft positioned in the reservoir holding the particulate material. A paddle mounted on the shaft and rotatable independent of the shaft is pushed by the rotation of the shaft. A rotational motion of the paddle as the shaft rotates is sensed. A processor determines an amount of the particulate material remaining in the reservoir based on the sensed rotational motion of the paddle.

A system for measuring a particulate material according to one example embodiment includes a container having a reservoir for storing the particulate material. A rotatable shaft is positioned within the reservoir. A paddle is mounted on the shaft and rotatable independent of the shaft. A driving member is rotatable with the shaft and positioned to push the paddle when the shaft rotates. The paddle is free to fall ahead of the driving member. At least one sensor is positioned to sense a rotational motion of the paddle as the shaft rotates. A processor in electronic communication with the at least one sensor is configured to determine an amount of the particulate material remaining in the reservoir based on the sensed rotational motion of the paddle.

An electrophotographic image forming device according to one example embodiment includes a replaceable unit having a reservoir for storing toner, a rotatable shaft positioned within the reservoir, a paddle mounted on the shaft and rotatable independent of the shaft, and a driving member rotatable with the shaft and positioned to push the paddle when the shaft rotates. The paddle is free to fall ahead of the driving member. At least one sensor is positioned to sense a rotational motion of the paddle as the shaft rotates. A processor in electronic communication with the at least one sensor is configured to determine an amount of toner remaining in the reservoir based on the sensed rotational motion of the paddle.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
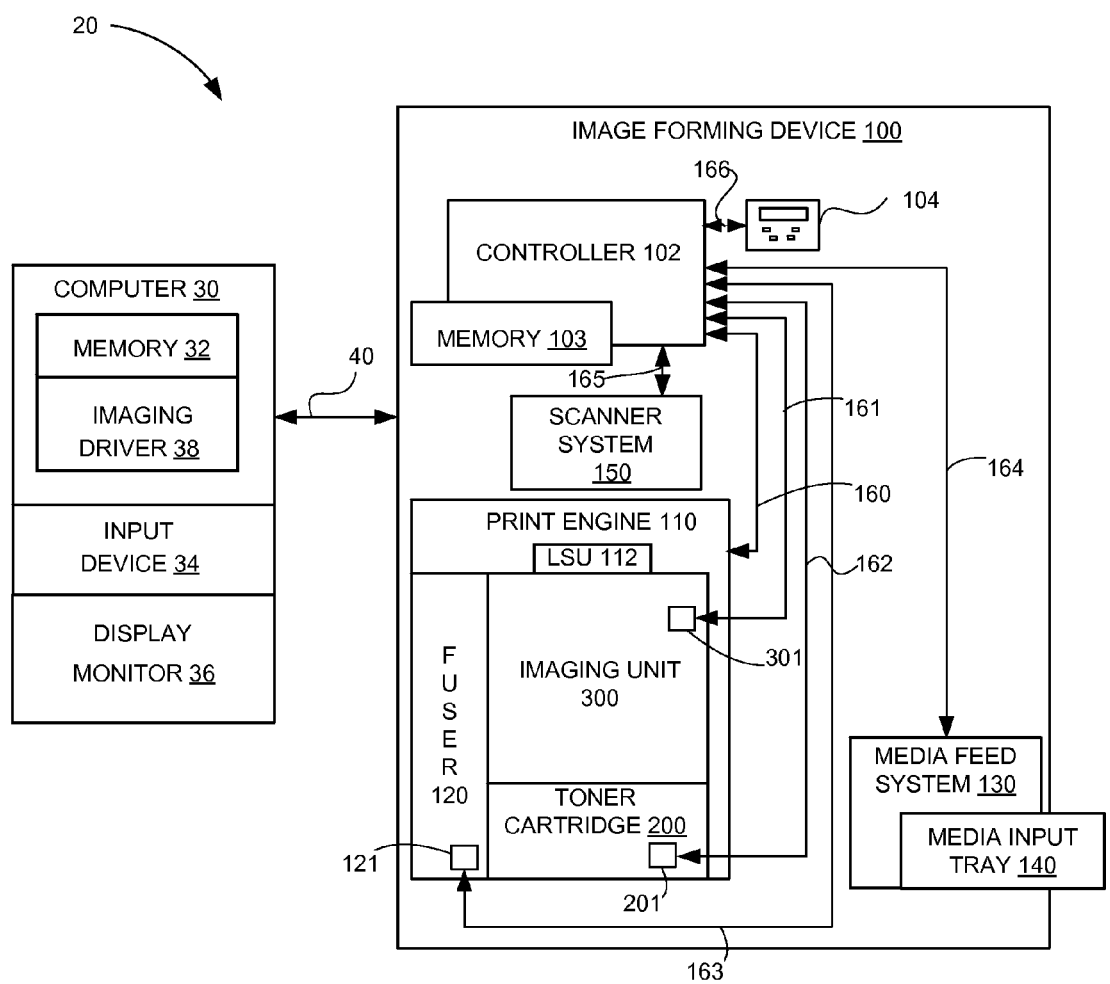
FIG. 1 is a block diagram depiction of an imaging system according to one example embodiment.

Referring now to the drawings and more particularly to FIG. 1, there is shown a block diagram depiction of an imaging system 20 according to one example embodiment. Imaging system 20 includes an image forming device 100 and a computer 30. Image forming device 100 communicates with computer 30 via a communications link 40. As used herein, the term "communications link" generally refers to any structure that facilitates electronic communication between multiple components and may operate using wired or wireless technology and may include communications over the Internet.

In the example embodiment shown in FIG. 1, image forming device 100 is a multifunction machine (sometimes referred to as an all-in-one (AIO) device) that includes a controller 102, a print engine 110, a laser scan unit (LSU) 112, one or more toner bottles or cartridges 200, one or more imaging units 300, a fuser 120, a user interface 104, a media feed system 130 and media input tray 140 and a scanner system 150. Image forming device 100 may communicate with computer 30 via a standard communication protocol, such as, for example, universal serial bus (USB), Ethernet or IEEE 802.xx. Image forming device 100 may be, for example, an electrophotographic printer/copier including an integrated scanner system 150 or a standalone electrophotographic printer.

Controller 102 includes a processor unit and associated memory 103 and may be formed as one or more Application Specific Integrated Circuits (ASICs). Memory 103 may be any volatile or non-volatile memory or combination thereof such as, for example, random access memory (RAM), read only memory (ROM), flash memory and/or non-volatile RAM (NVRAM). Alternatively, memory 103 may be in the form of a separate electronic memory (e.g., RAM, ROM, and/or NVRAM), a hard drive, a CD or DVD drive, or any memory device convenient for use with controller 102. Controller 102 may be, for example, a combined printer and scanner controller.

In the example embodiment illustrated, controller 102 communicates with print engine 110 via a communications link 160. Controller 102 communicates with imaging unit(s) 300 and processing circuitry 301 on each imaging unit 300 via communications link(s) 161. Controller 102 communicates with toner cartridge(s) 200 and processing circuitry 201 on each toner cartridge 200 via communications link(s) 162. Controller 102 communicates with fuser 120 and processing circuitry 121 thereon via a communications link 163. Controller 102 communicates with media feed system 130 via a communications link 164. Controller 102 communicates with scanner system 150 via a communications link 165. User interface 104 is communicatively coupled to controller 102 via a communications link 166. Processing circuitry 121, 201, 301 may include a processor and associated memory such as RAM, ROM, and/or NVRAM and may provide authentication functions, safety and operational interlocks, operating parameters and usage information related to fuser 120, toner cartridge(s) 200 and imaging units 300, respectively. Controller 102 processes print and scan data and operates print engine 110 during printing and scanner system 150 during scanning.

Computer 30, which is optional, may be, for example, a personal computer, including memory 32, such as RAM, ROM, and/or NVRAM, an input device 34, such as a keyboard and/or a mouse, and a display monitor 36. Computer 30 also includes a processor, input/output (I/O) interfaces, and may include at least one mass data storage device, such as a hard drive, a CD-ROM and/or a DVD unit (not shown). Computer 30 may also be a device capable of communicating with image forming device 100 other than a personal computer such as, for example, a tablet computer, a smartphone, or other electronic device.

In the example embodiment illustrated, computer 30 includes in its memory a software program including program instructions that function as an imaging driver 38, e.g., printer/scanner driver software, for image forming device 100. Imaging driver 38 is in communication with controller 102 of image forming device 100 via communications link 40. Imaging driver 38 facilitates communication between image forming device 100 and computer 30. One aspect of imaging driver 38 may be, for example, to provide formatted print data to image forming device 100, and more particularly to print engine 110, to print an image. Another aspect of imaging driver 38 may be, for example, to facilitate the collection of scanned data from scanner system 150.

In some circumstances, it may be desirable to operate image forming device 100 in a standalone mode. In the standalone mode, image forming device 100 is capable of functioning without computer 30. Accordingly, all or a portion of imaging driver 38, or a similar driver, may be located in controller 102 of image forming device 100 so as to accommodate printing and/or scanning functionality when operating in the standalone mode.

Figure 2:
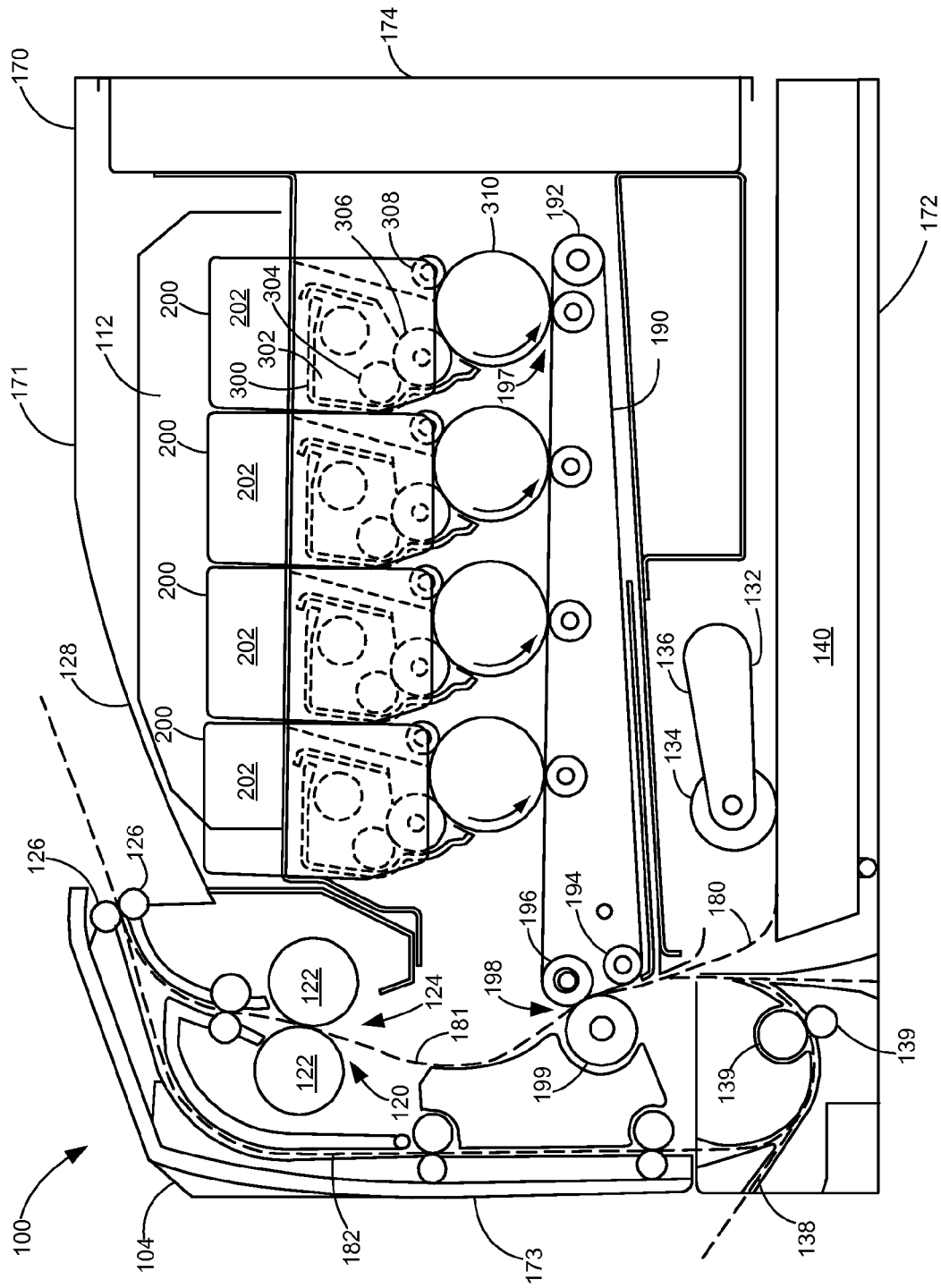
FIG. 2 is a schematic diagram of an image forming device according to a first example embodiment.

FIG. 2 illustrates a schematic view of the interior of an example image forming device 100. Image forming device 100 includes a housing 170 having a top 171, bottom 172, front 173 and rear 174. Housing 170 includes one or more media input trays 140 positioned therein. Trays 140 are sized to contain a stack of media sheets. As used herein, the term media is meant to encompass not only paper but also labels, envelopes, fabrics, photographic paper or any other desired substrate. Trays 140 are preferably removable for refilling. User interface 104 is shown positioned on housing 170. Using user interface 104, a user is able to enter commands and generally control the operation of the image forming device 100. For example, the user may enter commands to switch modes (e.g., color mode, monochrome mode), view the number of pages printed, etc. A media path 180 extends through image forming device 100 for moving the media sheets through the image transfer process. Media path 180 includes a simplex path 181 and may include a duplex path 182. A media sheet is introduced into simplex path 181 from tray 140 by a pick mechanism 132. In the example embodiment shown, pick mechanism 132 includes a roll 134 positioned at the end of a pivotable arm 136. Roll 134 rotates to move the media sheet from tray 140 and into media path 180. The media sheet is then moved along media path 180 by various transport rollers. Media sheets may also be introduced into media path 180 by a manual feed 138 having one or more rolls 139.

In the example embodiment shown, image forming device 100 includes four toner cartridges 200 removably mounted in housing 170 in a mating relationship with four corresponding imaging units 300 also removably mounted in housing 170. Each toner cartridge 200 includes a reservoir 202 for holding toner and an outlet port in communication with an inlet port of its corresponding imaging unit 300 for transferring toner from reservoir 202 to imaging unit 300. Toner is transferred periodically from a respective toner cartridge 200 to its corresponding imaging unit 300 in order to replenish the imaging unit 300. These periodic transfers are referred to as toner addition cycles and may occur during a print operation and/or between print operations. In the example embodiment illustrated, each toner cartridge 200 is substantially the same except for the color of toner contained therein. In one embodiment, the four toner cartridges 200 include black, cyan, yellow and magenta toner, respectively. Each imaging unit 300 includes a toner reservoir 302 and a toner adder roll 304 that moves toner from reservoir 302 to a developer roll 306. Each imaging unit 300 also includes a charging roll 308 and a photoconductive (PC) drum 310. PC drums 310 are mounted substantially parallel to each other when the imaging units 300 are installed in image forming device 100. For purposes of clarity, the components of only one of the imaging units 300 are labeled in FIG. 2. In the example embodiment illustrated, each imaging unit 300 is substantially the same except for the color of toner contained therein.

Each charging roll 308 forms a nip with the corresponding PC drum 310. During a print operation, charging roll 308 charges the surface of PC drum 310 to a specified voltage such as, for example, −1000 volts. A laser beam from LSU 112 is then directed to the surface of PC drum 310 and selectively discharges those areas it contacts to form a latent image. In one embodiment, areas on PC drum 310 illuminated by the laser beam are discharged to approximately −300 volts. Developer roll 306, which forms a nip with the corresponding PC drum 310, then transfers toner to PC drum 310 to form a toner image on PC drum 310. A metering device such as a doctor blade assembly can be used to meter toner onto developer roll 306 and apply a desired charge on the toner prior to its transfer to PC drum 310. The toner is attracted to the areas of the surface of PC drum 310 discharged by the laser beam from LSU 112.

An intermediate transfer mechanism (ITM) 190 is disposed adjacent to the PC drums 310. In this embodiment, ITM 190 is formed as an endless belt trained about a drive roll 192, a tension roll 194 and a back-up roll 196. During image forming operations, ITM 190 moves past PC drums 310 in a clockwise direction as viewed in FIG. 2. One or more of PC drums 310 apply toner images in their respective colors to ITM 190 at a first transfer nip 197. In one embodiment, a positive voltage field attracts the toner image from PC drums 310 to the surface of the moving ITM 190. ITM 190 rotates and collects the one or more toner images from PC drums 310 and then conveys the toner images to a media sheet at a second transfer nip 198 formed between a transfer roll 199 and ITM 190, which is supported by back-up roll 196.

A media sheet advancing through simplex path 181 receives the toner image from ITM 190 as it moves through the second transfer nip 198. The media sheet with the toner image is then moved along the media path 180 and into fuser 120. Fuser 120 includes fusing rolls or belts 122 that form a nip 124 to adhere the toner image to the media sheet. The fused media sheet then passes through exit rolls 126 located downstream from fuser 120. Exit rolls 126 may be rotated in either forward or reverse directions. In a forward direction, exit rolls 126 move the media sheet from simplex path 181 to an output area 128 on top 171 of image forming device 100. In a reverse direction, exit rolls 126 move the media sheet into duplex path 182 for image formation on a second side of the media sheet.

Figure 3:
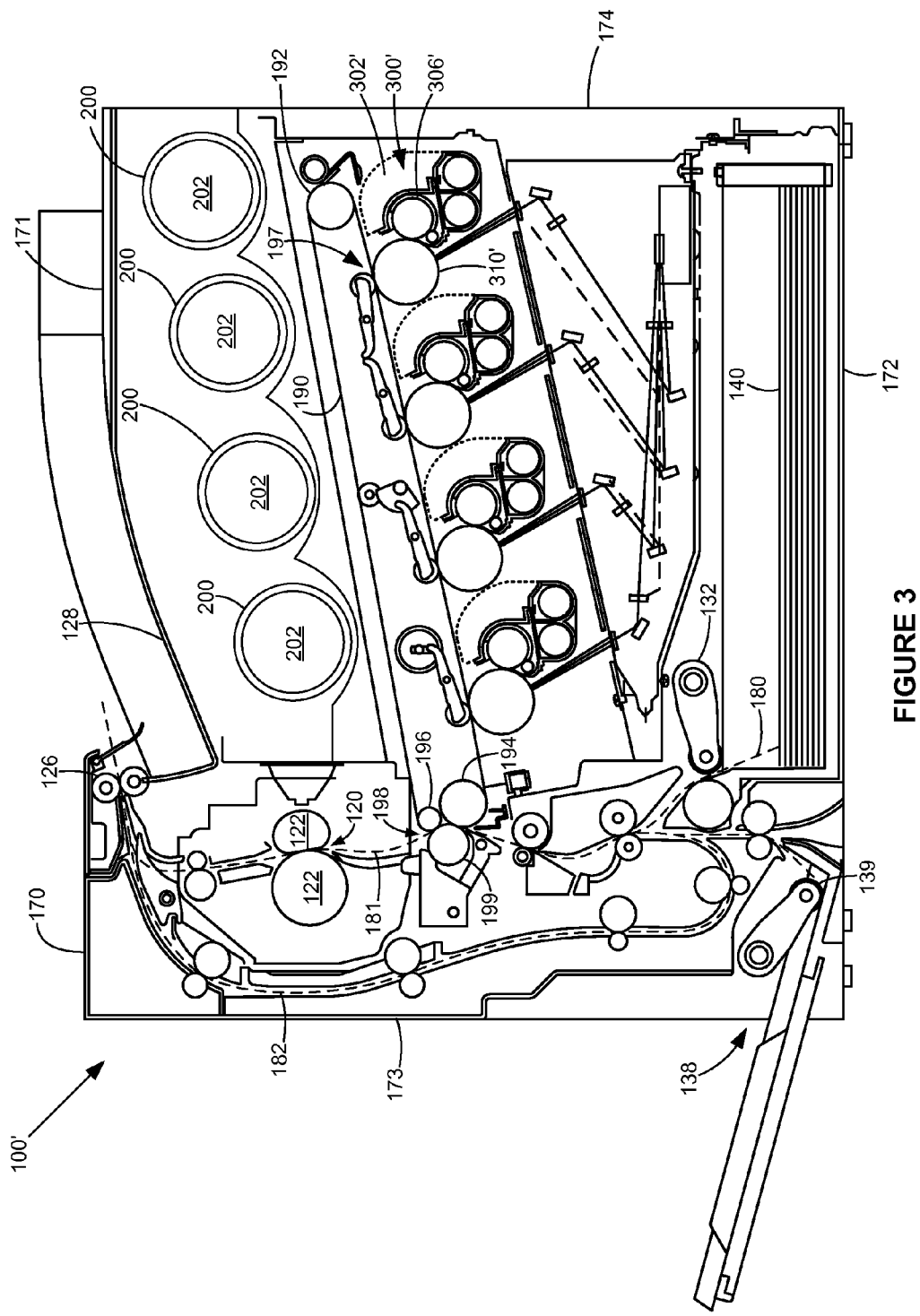
FIG. 3 is a schematic diagram of an image forming device according to a second example embodiment.

FIG. 3 illustrates an example embodiment of an image forming device 100' that utilizes what is commonly referred to as a dual component developer system. In this embodiment, image forming device 100' includes four toner cartridges 200 removably mounted in housing 170 and mated with four corresponding imaging units 300'. Toner is periodically transferred from reservoirs 202 of each toner cartridge 200 to corresponding reservoirs 302' of imaging units 300'. The toner in reservoirs 302' is mixed with magnetic carrier beads. The magnetic carrier beads may be coated with a polymeric film to provide triboelectric properties to attract toner to the carrier beads as the toner and the magnetic carrier beads are mixed in reservoir 302'. In this embodiment, each imaging unit 300' includes a magnetic roll 306' that attracts the magnetic carrier beads having toner thereon to magnetic roll 306' through the use of magnetic fields and transports the toner to the corresponding photoconductive drum 310'. Electrostatic forces from the latent image on the photoconductive drum 310' strip the toner from the magnetic carrier beads to provide a toned image on the surface of the photoconductive drum 310'. The toned image is then transferred to ITM 190 at first transfer nip 197 as discussed above.

While the example image forming devices 100 and 100' shown in FIGS. 2 and 3 illustrate four toner cartridges 200 and four corresponding imaging units 300, 300', it will be appreciated that a monocolor image forming device 100 or 100' may include a single toner cartridge 200 and corresponding imaging unit 300 or 300' as compared to a color image forming device 100 or 100' that may include multiple toner cartridges 200 and imaging units 300, 300'. Further, although imaging forming devices 100 and 100' utilize ITM 190 to transfer toner to the media, toner may be applied directly to the media by the one or more photoconductive drums 310, 310' as is known in the art.

Figure 4:
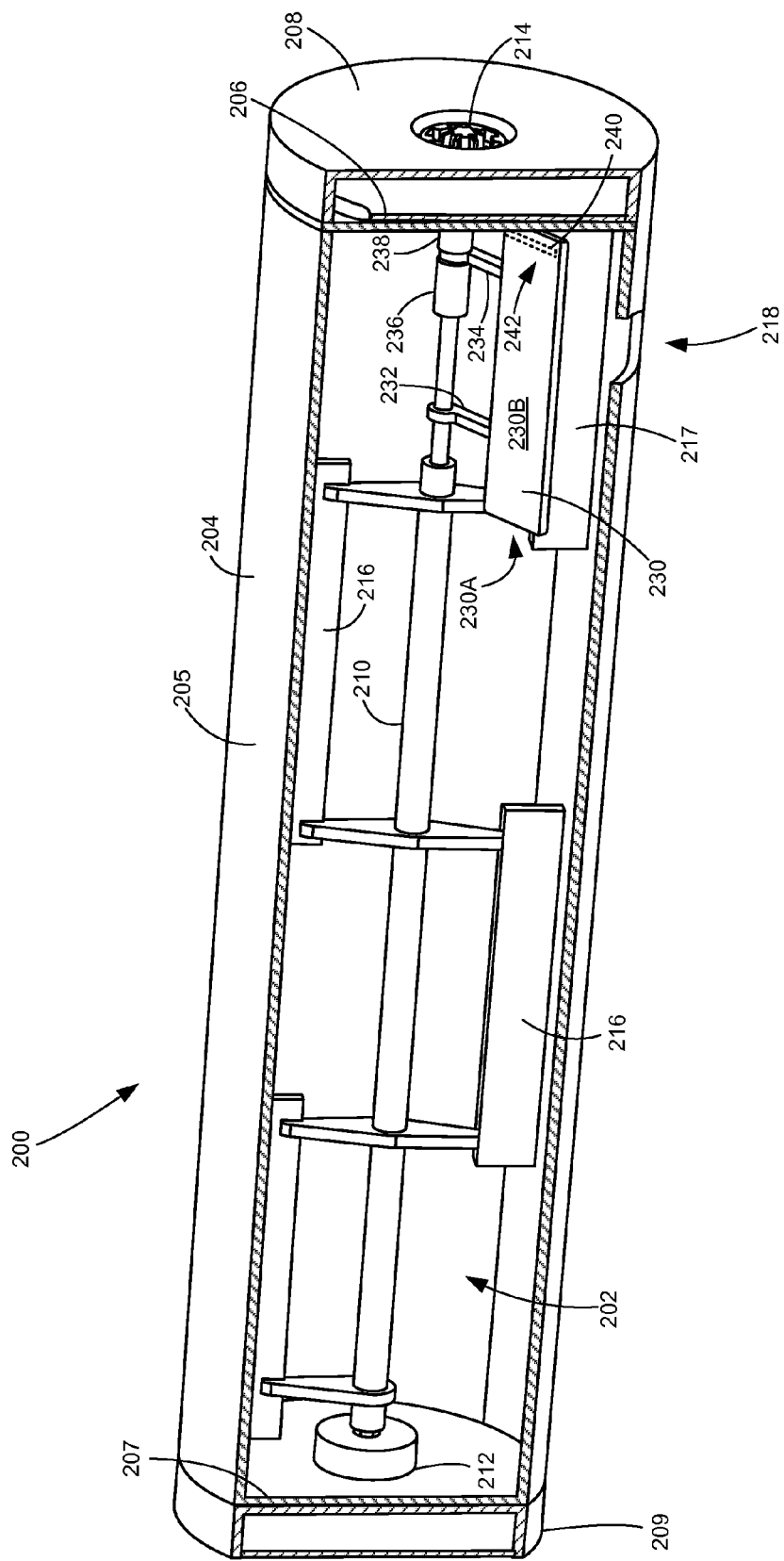
FIG. 4 is a perspective side view of a toner cartridge according to one example embodiment having a portion of a body of the toner cartridge removed to illustrate an internal toner reservoir.
Figure 5:
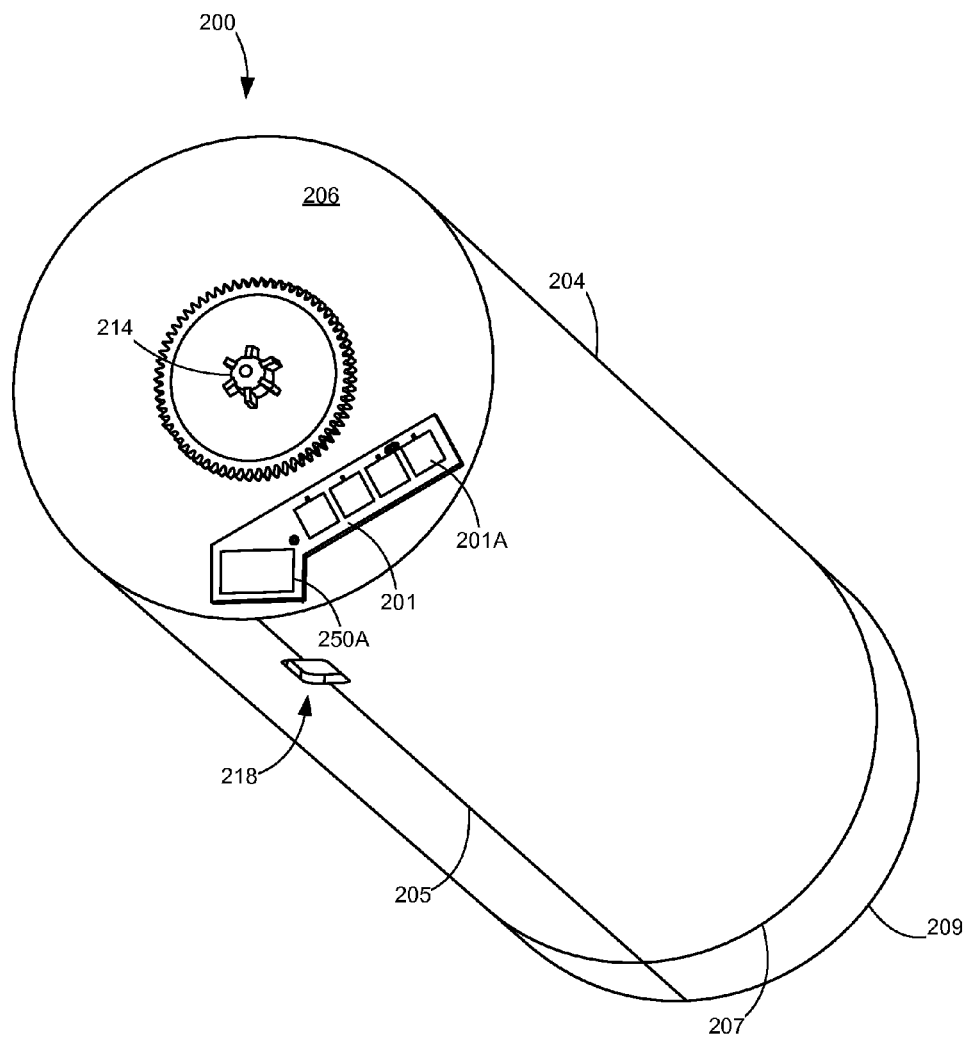
FIG. 5 is a perspective end view of the toner cartridge shown in FIG. 4.

With reference to FIGS. 4 and 5, toner cartridge 200 is shown according to one example embodiment. Toner cartridge 200 includes a body 204 that includes walls forming toner reservoir 202. In the example embodiment illustrated, body 204 includes a generally cylindrical wall 205 and a pair of end walls 206, 207. In this embodiment, end caps 208, 209 are mounted on end walls 206, 207, respectively such as by suitable fasteners (e.g., screws, rivets, etc.) or by a snap-fit engagement. FIG. 4 shows toner cartridge 200 with a portion of body 204 removed to illustrate the internal components of toner cartridge 200. A rotatable shaft 210 extends along the length of toner cartridge 200 within toner reservoir 202. As desired, the ends of rotatable shaft 210 may be received in bushings or bearings 212 positioned on an inner surface of end walls 206, 207. A drive element 214, such as a gear or other form of drive coupler, is positioned on an outer surface of end wall 206. When toner cartridge 200 is installed in the image forming device, drive element 214 receives rotational force from a corresponding drive component in the image forming device to rotate shaft 210. Shaft 210 may be connected directly or by one or more intermediate gears to drive element 214. One or more agitators 216 (e.g., paddle(s), auger(s), etc.) may be mounted on and rotate with shaft 210 to stir and move toner within reservoir 202 as desired. In one embodiment, a flexible strip 220 (FIGS. 6A-6C), for example a polyethylene terephthalate (PET) material such as MYLAR® available from DuPont Teijin Films, Chester, Va., USA, may be connected to a distal end of agitator(s) 216 to sweep toner from the interior surface of one or more of walls 205, 206, 207.

An outlet port 218 is positioned on a bottom portion of body 204 such as near end wall 206. In the example embodiment shown, toner exiting reservoir 202 is moved directly into outlet port 218 by agitator(s) 216, which may be positioned to urge toner toward outlet port 218 in order to promote toner flow out of reservoir 202. In another embodiment, exiting toner is moved axially with respect to shaft 210 by a rotatable auger from an opening into reservoir 202, through a channel in wall 205 and out of outlet port 218. The rotatable auger may be connected directly or by one or more intermediate gears to drive element 214 in order to receive rotational force. Alternatively, the rotatable auger may be driven separately from shaft 210 using a second drive element to receive rotational force from the image forming device independently from shaft 210. As desired, outlet port 218 may include a shutter or a cover (not shown) that is movable between a closed position blocking outlet port 218 to prevent toner from flowing out of toner cartridge 200 and an open position permitting toner flow. Shaft 210 and the rotatable auger (if present) are rotated during each toner addition cycle to deliver toner from reservoir 202 through outlet port 218.

A paddle 230 is mounted on shaft 210 and is free to rotate on shaft 210. In other words, paddle 230 is rotatable independent of shaft 210. Paddle 230 is axially positioned next to end wall 206 but may be positioned elsewhere in reservoir 202 so long as a magnetic element 240 of paddle 230 is detectable by a magnetic sensor as discussed below. Paddle 230 is spaced from the interior surfaces of walls 205, 206, 207 so that walls 205, 206, 207 do not impede the motion of paddle 230. In the example embodiment illustrated, paddle 230 is axially positioned above the opening from outlet port 218 into reservoir 202 such that the rotational path of paddle 230 passes above the opening from outlet port 218 into reservoir 202. However, if the toner level for a particular design of reservoir 202 is substantially uniform, paddle 230 may be positioned elsewhere along shaft 210. Paddle 230 includes a pair of radial mounts 232, 234 each having an opening that receives shaft 210. Alternatively, paddle 230 may include one or more than two mounts. In the embodiment illustrated, stops 236, 238 are positioned on opposite axial sides of one or more of radial supports 232, 234 to limit the axial movement of paddle 230 along shaft 210.

Paddle 230 includes a magnetic element 240 that rotates with paddle 230 and is detectable by a magnetic sensor for determining an amount of toner remaining in reservoir 202 as discussed in greater detail below. In one embodiment, magnetic element 240 is positioned at an axially outermost portion of paddle 230 near end wall 206 in order to permit detection by a magnetic sensor on end wall 206 (either mounted directly on end wall 206 or indirectly on end wall 206, such as on end cap 208) or on a portion of the image forming device adjacent to end wall 206 when toner cartridge 200 is installed in the image forming device. In one embodiment, paddle 230 is composed of a non-magnetic material and magnetic element 240 is held by a friction fit in a cavity 242 in paddle 230. For example, paddle 230 may be formed of plastic overmolded around magnetic element 240. Magnetic element 240 may also be attached to paddle 230 using an adhesive or fastener(s) so long as magnetic element 240 will not dislodge from paddle 230 during operation of toner cartridge 200. Magnetic element 240 may be any suitable size and shape so as to be detectable by a magnetic sensor. For example, magnetic element 240 may be a cube, a rectangular, octagonal or other form of prism, a sphere or cylinder, a thin sheet or an amorphous object. In another embodiment, paddle 230 is composed of a magnetic material such that the body of paddle 230 forms the magnetic element 240. Magnetic element 240 may be composed of any suitable magnetic material such as steel, iron, nickel, etc. In one embodiment, body 204 and agitator 216 are composed of a non-magnetic material, such as plastic, in order to permit detection of the position of magnetic element 240 by a magnetic sensor.

Paddle 230 is axially aligned on shaft 210 with a driving member 217 mounted on shaft 210 such that paddle 230 is in the rotational path of driving member 217. In this manner, driving member 217 is able to push paddle 230 when shaft 210 rotates. In the example embodiment illustrated, an agitator 216 serves as driving member 217; however, a paddle or other form of extension from shaft 210 may serve as the driving member 217. In one embodiment, shaft 210 and driving member 217 rotate at a substantially constant rotational speed when driven by drive element 214. Driving member 217 pushes a rear surface 230A of paddle 230. Paddle 230 may include ribs or other predefined contact points on its rear surface 230A for engagement with driving member 217.

Figure 6A:
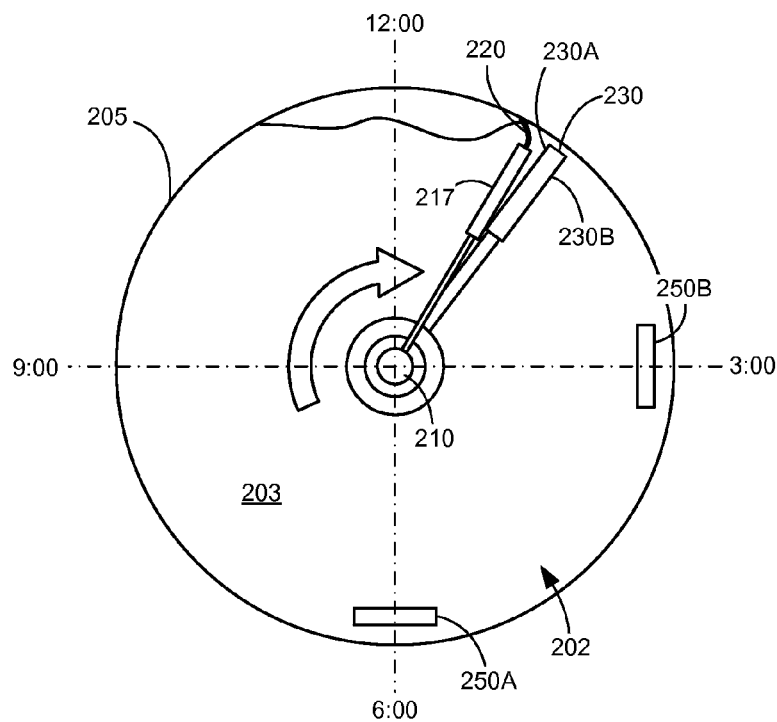
FIGS. 6A-C are schematic diagrams of a side view of the toner cartridge illustrating the operation of a falling paddle at various toner levels.
Figure 6B:
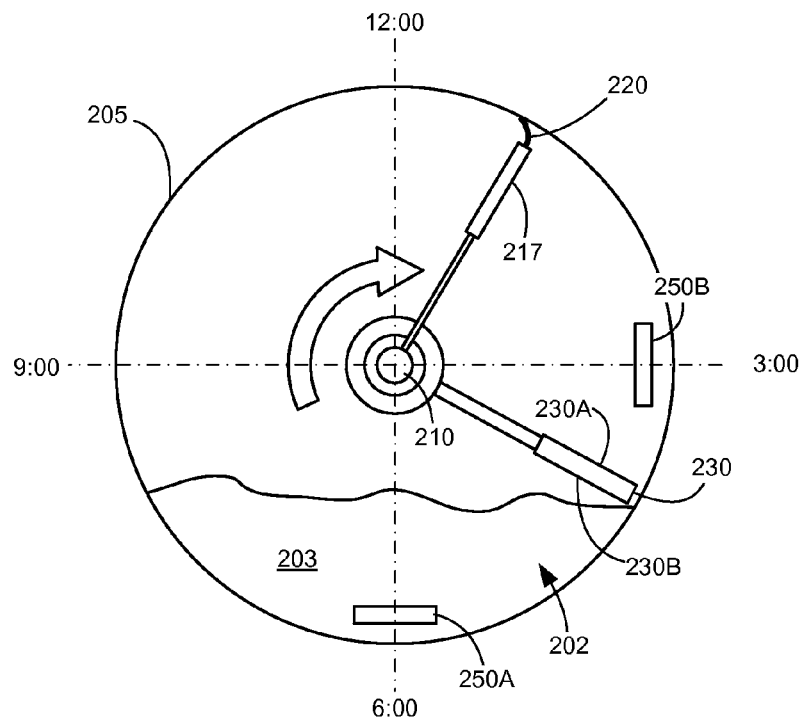
Figure 6C:
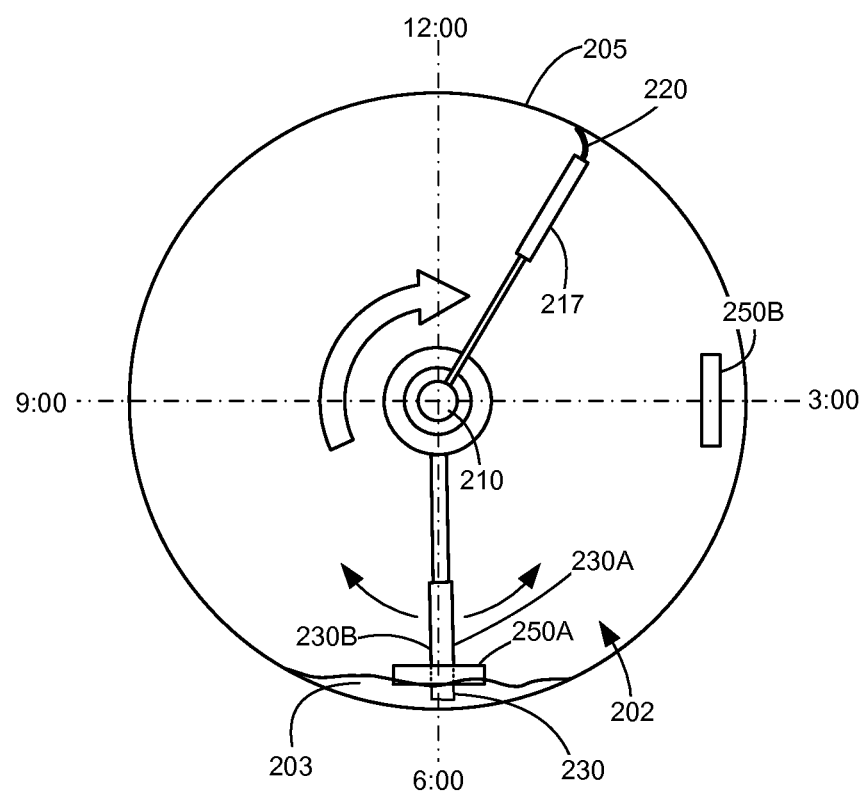

FIGS. 6A-6C schematically depict the relationship between paddle 230 and driving member 217. FIGS. 6A-6C depict a clock face in dashed lines along the rotational path of paddle 230 in order to aid in the description of the operation of paddle 230. When toner reservoir 202 is relatively full as depicted in FIG. 6A, toner 203 present in reservoir 202 prevents paddle 230 from rotating freely about shaft 210. Instead, paddle 230 is pushed through its rotational path by driving member 217 when shaft 210 rotates. As a result, when toner reservoir 202 is relatively full as shaft 210 rotates, the rotational motion of paddle 230 follows the rotational motion of driving member 217. Toner 203 prevents paddle 230 from advancing quicker than driving member 217.

As the toner level in reservoir 202 decreases as depicted in FIG. 6B, as paddle 230 is pushed through the upper vertical position of rotation (the "12 o'clock" position) by driving member 217, paddle 230 tends to separate from driving member 217 and fall faster (toward the "3 o'clock" position) than driving member 217 is being driven due to the weight of paddle 230. As a result, paddle 230 may be referred to as a falling paddle. Paddle 230 falls forward under its own weight until a front face 230B of paddle 230 contacts toner 203, which stops the rotational advance of paddle 230. In this manner, paddle 230 remains substantially stationary on top of (or slightly below the surface of) toner 203 until driving member 217 catches up with paddle 230. When driving member 217 advances and re-engages with rear surface 230A of paddle 230, driving member 217 resumes pushing paddle 230 through its rotational path.

When the toner level in reservoir 202 gets low as depicted in FIG. 6C, paddle 230 tends to fall forward away from driving member 217 as paddle passes the "12 o'clock" position and tends to swing all the way down to the lower vertical position of its rotational path (the "6 o'clock" position). Depending on how much toner 203 remains, paddle 230 may tend to oscillate back and forth in a pendulum manner about the "6 o'clock" position until driving member 217 catches up to resume pushing paddle 230. As a result, it will be appreciated that the rotational motion of paddle 230 relates to the amount of toner 203 remaining in reservoir 202. FIGS. 6A-6C show shaft 210 rotating in a clockwise direction when viewed from end wall 206; however, the direction of rotation may be reversed as desired.

Figure 7C:
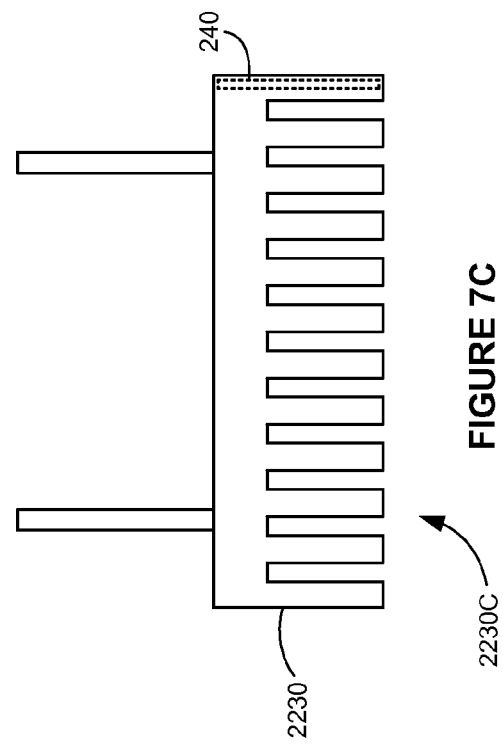
FIG. 7C is a front view of a paddle according to a third example embodiment.
Figure 7D:
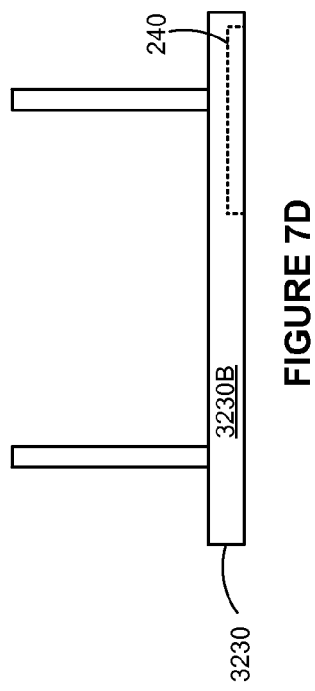
FIG. 7D is a front view of a paddle according to a fourth example embodiment.
Figure 7A:
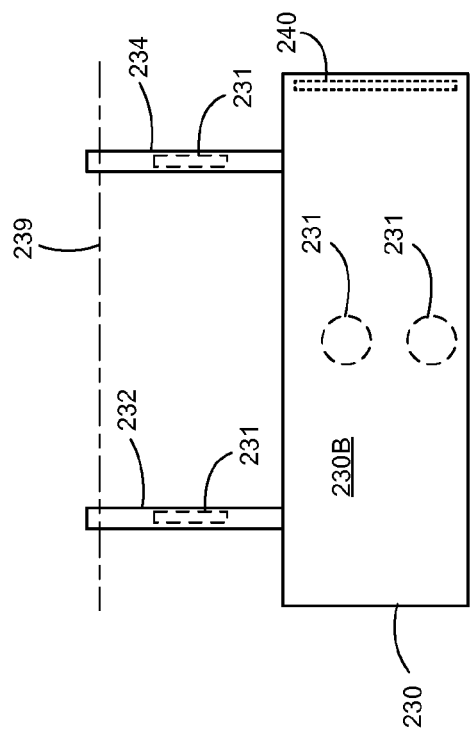
FIG. 7A is a front view of a paddle according to a first example embodiment.
Figure 7B:
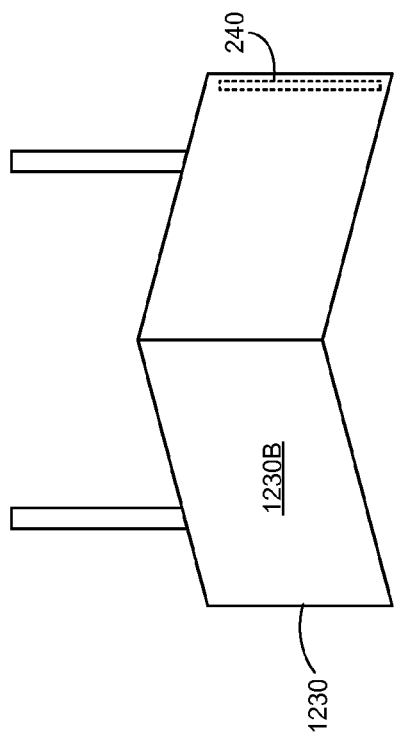
FIG. 7B is a front view of a paddle according to a second example embodiment.

Paddle 230 has minimal rotational friction other than its interaction with toner 203 in reservoir 202. As a result, shaft 210 provides radial support for paddle 230 but does not impede the rotational movement of paddle 230. Paddle 230 may be weighted as desired in order to alter its rotational movement. Paddle 230 may take many shapes and sizes as desired. For example, FIG. 7A illustrates the paddle 230 shown in FIGS. 4 and 5. In this embodiment, front face 230B of paddle 230 is substantially planar and normal to the direction of motion of paddle 230 (parallel to shaft 210) to allow front face 230B of paddle 230 to strike toner 203 as paddle 230 falls. In an alternative embodiment, front face 230B of paddle 230 is angled with respect to the direction of motion of paddle 230 (angled with respect to shaft 210). As shown in FIG. 7A, paddle 230 may include one or more weights 231 mounted on paddle 230 and positioned relative to an axis of rotation 239 of paddle 230 as desired to control the rotational movement of paddle 230. FIG. 7B illustrates a V-shaped paddle 1230 having a front face 1230B forming a concave portion of the V-shaped profile for directing toner 203 away from end wall 206 and into outlet port 218. FIG. 7C illustrates a paddle 2230 having a comb portion 2230C for decreasing the friction between paddle 2230 and toner 203. FIG. 7D illustrates a paddle 3230 having a front face 3230B having a smaller surface area as compared with front face 230B of paddle 230 in order to reduce the drag through toner 203.

One or more magnetic sensors 250 positioned on end wall 206 of toner cartridge 200 or positioned on a portion of the image forming device adjacent to end wall 206 when toner cartridge 200 is installed in the image forming device may be used to determine the amount of toner 203 remaining in reservoir 202 by sensing the motion of paddle 230 as shaft 210 rotates. Magnetic sensor(s) 250 may be any suitable device capable of detecting the presence or absence of a magnetic field. For example, magnetic sensor(s) 250 may be a hall-effect sensor, which is a transducer that varies its electrical output in response to a magnetic field. Two magnetic sensors 250A, 250B are depicted in FIGS. 6A-6C. A first magnetic sensor 250A is positioned between about the "5 o'clock" position and about the "7 o'clock" position, such as at about the "6 o'clock" position as shown. An optional second magnetic sensor 250B is positioned between about the "2 o'clock" position and about the "4 o'clock" position. In the example embodiment illustrated, magnetic sensor 250B is positioned at about the "3 o'clock" position.

FIG. 5 shows magnetic sensor 250A positioned on an outer surface of end wall 206. In this embodiment, magnetic sensor 250A is in electronic communication with processing circuitry 201 of toner cartridge 200, which may also be mounted on end wall 206 (either directly on the outer surface of end wall 206 or indirectly on end wall 206, such as on end cap 208). Processing circuitry 201 and/or magnetic sensor 250A contains one or more electrical contacts 201A that contact corresponding electrical contact(s) in the image forming device when toner cartridge 200 is installed in the image forming device to facilitate communication with controller 102. Magnetic sensor(s) 250 and processing circuitry 201 may be positioned on other portions of body 204 as desired so long as magnetic sensor(s) 250 are able to detect the presence of magnetic element 240 of paddle 230 at a point in the rotational path of paddle 230. For example, in another embodiment, magnetic element 240 is positioned along the outer radial edge of paddle 230 and magnetic sensor 250A is positioned along the bottom of the outer surface of wall 205.

In one embodiment, two magnetic sensors 250A and 250B are used to determine an amount of toner 203 remaining in reservoir 202. Magnetic sensor 250B is positioned to sense the presence of magnetic element 240 as paddle 230 begins to move away from driving member 217 once the toner level in reservoir 202 is low enough to allow paddle 230 to advance ahead of driving member 217. Magnetic sensor 250A is aligned at or near the lowest center of gravity of paddle 230 to sense the presence of magnetic element 240 near the lowest center of gravity of paddle 230 where paddle 230 oscillates when the toner level in reservoir 202 is low. In this embodiment, magnetic sensors 250A and 250B provide time stamp data used by controller 102 or a processor in communication with controller 102, such as a processor of processing circuitry 201, to determine how long it takes paddle 230 to pass from magnetic sensor 250B to magnetic sensor 250A during rotation of shaft 210. In this manner, magnetic sensor 250B may be referred to as the start sensor and magnetic sensor 250A may be referred to as the stop sensor.

Figure 8:
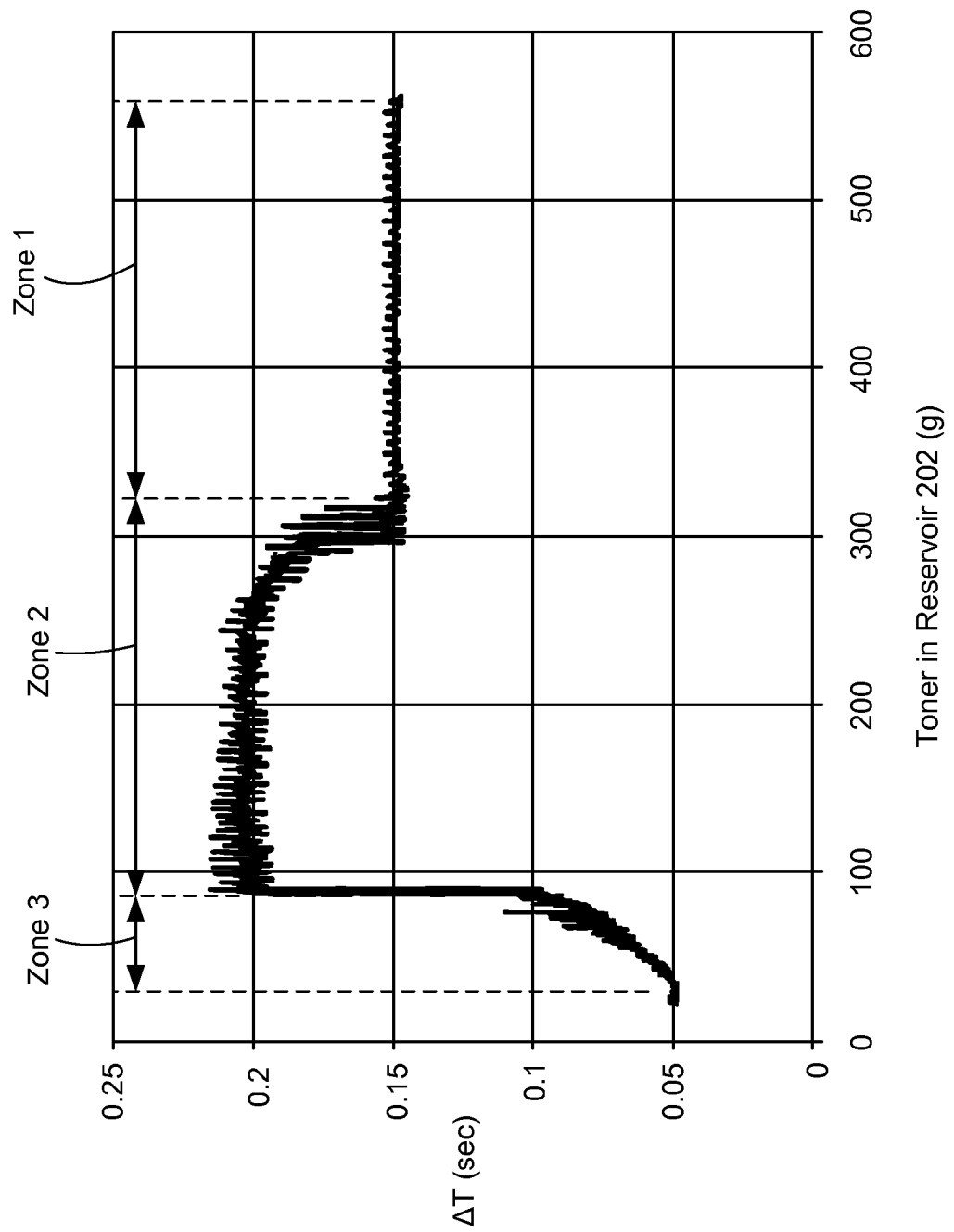
FIG. 8 is a line graph of a time difference between the detection of a magnetic element of a falling paddle by a start sensor and the detection of the magnetic element by a stop sensor (in seconds) versus an amount of toner remaining in a reservoir (in grams) over the life of one example embodiment of a toner cartridge.

FIG. 8 shows a graph of the time difference ΔT between the detection of magnetic element 240 of paddle 230 by the start sensor and the detection of magnetic element 240 by the stop sensor (in seconds) during rotation of shaft 210 versus the amount of toner 203 remaining in reservoir 202 (in grams) over the life of one example embodiment of toner cartridge 200. The graph is divided into three "Zones" to help illustrate the operation of paddle 230. In Zone 1, reservoir 202 is relatively full of toner 203 such as depicted in FIG. 6A. In Zone 1, paddle 230 moves at the same speed as driving member 217 due to the resistance provided by toner 203. As a result, the time difference ΔT values in Zone 1 reflect the rotational speed of shaft 210 and driving member 217. In the example embodiment illustrated in FIG. 8, shaft 210 was rotated at 100 RPM (0.6 seconds per revolution) and magnetic sensors 250A and 250B were separated by 90 degrees resulting in a ΔT of about 0.15 seconds in Zone 1.

In Zone 2, the toner level in reservoir 202 is low enough that paddle 230 falls forward ahead of driving member 217 after paddle 230 passes the "12 o'clock" position such as depicted in FIG. 6B. In Zone 2, paddle 230 falls forward away from driving member 217 and reaches the start sensor ahead of driving member 217. Paddle 230 then rests on toner 203 in reservoir 202 between the start sensor and the stop sensor until driving member 217 catches up with paddle 230 and resumes pushing paddle 230. As a result, the time difference ΔT values in Zone 2 increase with respect to the ΔT values in Zone 1 due to the arrival of paddle 230 at the start sensor ahead of driving member 217.

In Zone 3, the toner level in reservoir 202 is low such as depicted in FIG. 6C. In Zone 3, paddle 230 falls forward away from driving member 217 and passes both the start sensor and the stop sensor as a result of its own inertia without needing to be pushed by driving member 217. As a result, the time difference ΔT values in Zone 3 reflect the rotational speed of paddle 230 as it falls ahead of driving member 217. The time difference ΔT values in Zone 3 are less than the ΔT values in Zones 1 and 2. The ΔT values in Zone 3 continue to decrease as the toner level in reservoir 202 decreases due to decreased resistance to paddle 230 as paddle 230 falls.

The amount of toner 203 remaining in reservoir 202 at the transitions from Zone 1 to Zone 2 and from Zone 2 to Zone 3 may be determined empirically for a particular toner cartridge design. As a result, the detection of these transitions may be used to determine the amount of toner 203 remaining in reservoir 202. Further, the nearly linear decrease in ΔT values in Zone 3 can be converted to an amount of toner 203 remaining in reservoir 202 providing a measurement of the toner 203 remaining when reservoir 202 is near empty. When the toner level is in Zones 1 and 2 between the transitions from Zone 1 to Zone 2 and from Zone 2 to Zone 3, the toner level in reservoir 202 can be approximated based on an empirically derived feed rate of toner 203 from toner reservoir 202 into the corresponding imaging unit. For example, in one embodiment, it has been observed that the feed rate of toner 203 from reservoir 202 decreases linearly as the toner level in reservoir 202 decreases. The feed rate of toner 203 from reservoir 202 may be measured as the mass of toner delivered from reservoir 202 per each toner addition cycle. The amount of rotation of and geometry of agitator(s) 216 and the rotatable auger (if present) determine how much toner 203 is fed per toner addition cycle. It will be appreciated by those skilled in the art that the use of a rotatable auger to exit toner 203 from reservoir 202 helps control the precision of the feed rate of toner 203 exiting toner cartridge 200. The linear decrease in the feed rate of toner 203 from reservoir 202 is due to the decrease in density of the toner 203 in reservoir 202 as the height of toner 203 decreases. As a result, the toner level in reservoir 202 in Zone 1 can be approximated by starting with the initial amount of toner 203 supplied in reservoir 202 and reducing the amount of toner 203 in reservoir 202 per each toner addition cycle based on the empirically determined feed rate. The estimated amount of toner remaining may be reset when the transition from Zone 1 to Zone 2 is detected based on the empirically determined amount of toner remaining when this transition occurs. The toner level in reservoir 202 in Zone 2 can then be approximated based on the empirically determined feed rate. The estimated amount of toner remaining may be reset again when the transition from Zone 2 to Zone 3 is detected based on the empirically determined amount of toner remaining when this transition occurs. The ΔT values detected in Zone 3 may then be converted to an amount of toner 203 to provide an estimate of the amount of toner 203 remaining in reservoir 202 until toner cartridge 200 is empty. In one embodiment, reservoir 202 is deemed empty or near empty and a message indicating that reservoir 202 is empty or near empty is displayed on user interface 104 and/or display monitor 36 when the ΔT values detected fall below a predetermined value.

The transitions from Zone 1 to Zone 2 and from Zone 2 to Zone 3 depend on such factors as the geometry of paddle 230, the friction between paddle 230 and shaft 210, the weight of paddle 230 and the rotational speed of shaft 210. For example, increasing the weight of paddle 230 tends to make the transitions from Zone 1 to Zone 2 and from Zone 2 to Zone 3 occur at greater toner amounts (i.e., the transition points shown in FIG. 8 would move to the right). Decreasing the weight of paddle 230 tends to have the opposite effect. Further, if shaft 210 is rotated too fast (e.g., at speeds above about 200-300 RPM), paddle 230 may not fall away from driving member 217 thereby inhibiting the ability to use the time difference ΔT values to determine the amount of toner remaining in reservoir 202.

As mentioned above, when the toner level in reservoir 202 is very low, paddle 230 may tend to oscillate back and forth about the "6 o'clock" position until driving member 217 catches up to resume pushing paddle 230. As a result, the stop sensor may sense magnetic element 240 multiple times as paddle 230 oscillates before the start sensor once again senses magnetic element 240. The extra passes of magnetic element 240 of paddle 230 past the stop sensor may be ignored by software executed by controller 102 (or another processor processing the data from magnetic sensors 250A and 250B).

It will be appreciated that shaft 210 may start and stop its rotation at random times and at random points along the rotational path of shaft 210. As a result, in Zones 1 and 2, paddle 230 may be positioned between the start sensor and the stop sensor when shaft 210 stops rotating potentially producing an extremely large ΔT value since paddle 230 won't reach the stop sensor until shaft 210 rotates again. In Zone 3, on the other hand, paddle 230 tends to fall through both the start sensor and the stop sensor. In one embodiment, shaft 210 is rotated at least about 1.5 revolutions (540 degrees) each time it rotates in order to ensure that paddle 230 passes both the start sensor and the stop sensor at least once per toner addition cycle.

In one embodiment, one magnetic sensor 250A is used to determine an amount of toner 203 remaining in reservoir 202 (without magnetic sensor 250B). Magnetic sensor 250A is aligned at or near the lowest center of gravity of paddle 230 to sense the presence of magnetic element 240 near where paddle 230 oscillates when the toner level in reservoir 202 is low. The number of passes of paddle 230 past magnetic sensor 250A per each revolution of shaft 210 may be correlated to the amount of toner 203 in reservoir 202 when the toner level is low.

Figure 9:
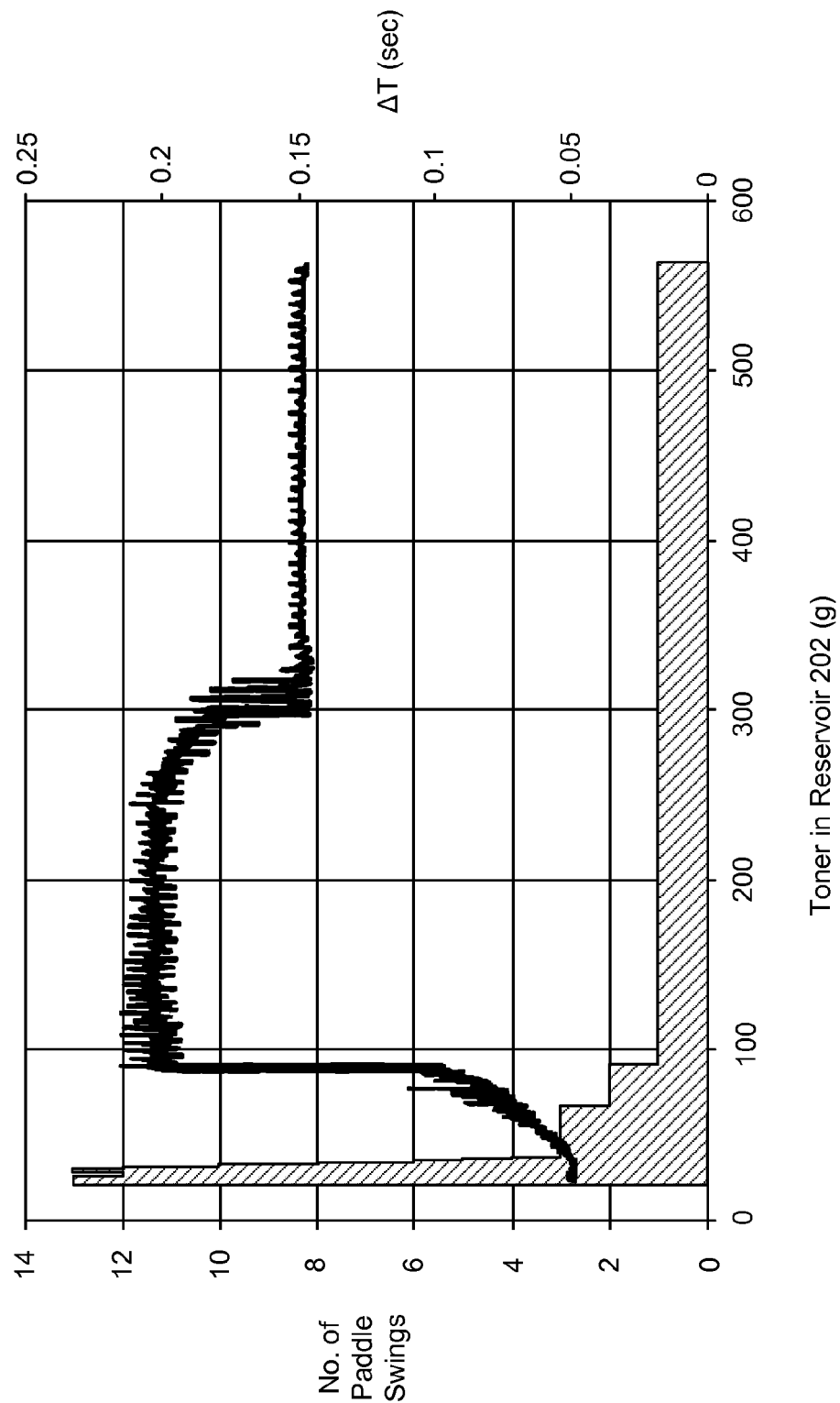
FIG. 9 is a bar graph of the number of passes of a falling paddle past a magnetic sensor per rotation of a shaft versus an amount of toner remaining in a reservoir (in grams) over the life of one example embodiment of a toner cartridge overlaid on the graph shown in FIG. 8.

FIG. 9 shows a graph of the number of passes of paddle 230 past magnetic sensor 250A per rotation of shaft 210 versus the amount of toner 203 remaining in reservoir 202 (in grams) over the life of one example embodiment of toner cartridge 200 overlaid on the graph shown in FIG. 8. Before the toner level in reservoir 202 is low such as depicted in FIGS. 6A and 6B, paddle 230 passes magnetic sensor 250A once per revolution of shaft 210. Specifically, the resistance provided by toner 203 in reservoir 202 prevents paddle 230 from reaching magnetic sensor 250A ahead of driving member 217. Once the toner level in reservoir 202 is low, however, as depicted in FIG. 6C paddle 230 begins to oscillate or swing in a pendulum manner past magnetic sensor 250A more than one time per revolution of shaft 210. As the toner level decreases, the number of passes of paddle 230 past magnetic sensor 250A per revolution of shaft 210 increases as a result of the decreased resistance from toner 203. The number of passes of paddle 230 past magnetic sensor 250A per revolution of shaft 210 may reach twelve or more when the toner level in reservoir 202 is very low depending on the speed of shaft 210 and the swing period of paddle 230. In one embodiment, reservoir 202 is deemed empty or near empty and a message indicating that reservoir 202 is empty or near empty is displayed on user interface 104 and/or display monitor 36 when the number of passes of paddle 230 past magnetic sensor 250A per revolution of shaft 210 exceeds a predetermined value (e.g., four passes per revolution, twelve passes per revolution, etc.).

It will be appreciated from FIG. 9 that counting or monitoring the number of passes of paddle 230 past magnetic sensor 250A provides an indication of the amount of toner 203 remaining in reservoir 202 when the toner level is low (i.e., when paddle 230 passes magnetic sensor 250A more than once per revolution of shaft 210). Before the toner level is low (i.e., when paddle 230 passes magnetic sensor 250A once per revolution of shaft 210), the toner level in reservoir 202 can be approximated based on the empirically determined feed rate of toner 203 from toner reservoir 202 into the corresponding imaging unit as discussed above. As a result, the toner level in reservoir 202 can be approximated by starting with the initial amount of toner 203 supplied in reservoir 202 and reducing the amount of toner 203 in reservoir 202 per each toner addition cycle based on the empirically determined feed rate. This estimation of the toner level in reservoir 202 may be used until magnetic sensor 250A detects paddle 230 passing more than once during a revolution of shaft 210. Once paddle 230 begins passing magnetic sensor 250A more than once per revolution of shaft 210, the number of pulses detected by magnetic sensor 250A per revolution of shaft 210 may be used to determine the amount of toner 203 remaining in reservoir 202.

Where a single magnetic sensor 250A is used, in one embodiment, shaft 210 is driven at a relatively low speed such as, for example, from less than 10 RPM to about 80 RPM including all increments and values therebetween such as about 40 RPM or less in order to allow paddle 230 to oscillate past magnetic sensor 250A more than once per revolution of shaft 210 when reservoir 202 has little toner remaining before driving member 217 resumes pushing paddle 230. The slower shaft 210 rotates, the more paddle 230 may oscillate before driving member 217 catches up to paddle 230.

If shaft 210 rotates at a relatively high speed such as, for example, greater than about 80 RPM, paddle 230 may not have time to oscillate past magnetic sensor 250A before driving member 217 catches up or paddle 230 may not fall away from driving member 217. However, regardless of the speed of shaft 210, the number of oscillations of paddle 230 past magnetic sensor 250A may be measured when shaft 210 is stopped. As a result, in another embodiment, shaft 210 is rotated at a speed of at least about 40 RPM and stopped periodically in order to collect oscillation data. It will be appreciated that in this embodiment if driving member 217 is positioned near the "6 o'clock" position when shaft 210 stops, driving member 217 may interfere with the oscillation data of paddle 230. Accordingly, where shaft 210 is driven at speed above about 40 RPM and stopped periodically to collect oscillation data, it is preferred to avoid rotating shaft 210 a full 360 degree rotation or a multiple thereof each time shaft 210 rotates (i.e., 360 degrees, 720 degrees, 1080 degrees, etc.), otherwise driving member 217 may tend to be positioned near the "6 o'clock" position every time shaft 210 stops thereby interfering with the oscillation data of paddle 230. Similarly, if shaft 210 is rotated in half rotation increments each time shaft 210 rotates (i.e., 180 degrees, 540 degrees, 900 degrees, etc.), driving member 217 may tend to be positioned near the "6 o'clock" position every other time shaft 210 stops. Accordingly, in one embodiment where shaft 210 is driven at speed above about 40 RPM and stopped periodically to collect oscillation data, shaft 210 is rotated at least about 10 degrees more or less than any full or half rotation (e.g., between about 190 degrees and about 350 degrees, between about 370 degrees and about 530 degrees, between about 550 degrees and about 710 degrees, between about 730 degrees and about 890 degrees, etc.) each time shaft 210 rotates in order to prevent driving member 217 from repeatedly stopping near the "6 o'clock" position and interfering with the oscillation data of paddle 230. For example, in the example embodiment illustrated in FIGS. 8 and 9, shaft 210 was rotated 550 degrees at 100 RPM and paused for about 3 seconds between each 550 degree rotation in order to allow paddle 230 to swing.

In addition to the rotational speed of shaft 210, the point at which the transition from Zone 2 to Zone 3 occurs (the sensing range when one magnetic sensor 250A is used) and the swing period of paddle 230 depend on the weight of paddle 230 and the radius of gyration of paddle 230. As discussed above, paddle 230 may be weighted using one or more optional weights 231 in order to provide a desired weight distribution to define the weight and radius of gyration of paddle 230. Specifically, control of the sensing range by the weight of paddle 230 and the center of gravity of paddle 230 is governed by the initial energy state at the onset of the fall of paddle 230 for a given weight and radius of gyration of paddle 230. As paddle 230 encounters toner 203 in reservoir 202 with each oscillation, this energy is diminished by an amount that is a function of the mass of toner 203 encountered by paddle 230 during that oscillation. This decrease in energy occurs until paddle 230 stops swinging (either through encounters with toner 203 or through other frictions or resistance such as the energy lost in the frictional interface between paddle 230 and shaft 210). In addition to the sensing range, the number of oscillations of paddle 230 that occur when reservoir 202 is empty (the sensing resolution when one magnetic sensor 250A is used) also depends on the weight distribution of paddle 230.

Accordingly, an amount of toner remaining in a reservoir may be determined by sensing the rotational motion of a falling paddle, such as paddle 230, mounted on a rotatable shaft and rotatable independent of the shaft within the reservoir. Because the motion of paddle 230 is detectable by a sensor outside of reservoir 202, paddle 230 may be provided without an electrical or mechanical connection to the outside of body 204 (other than shaft 210). This avoids the need to seal an additional connection into reservoir 202, which could be susceptible to leakage. Because no sealing of paddle 230 is required, no sealing friction exists that could alter the motion of paddle 230. Further, positioning the magnetic sensor(s) outside of reservoir 202 reduces the risk of toner contamination, which could damage the sensor(s). The magnetic sensor(s) may also be used to detect the installation of toner cartridge 200 in the image forming device and to confirm that shaft 210 is rotating properly thereby eliminating the need for additional sensors to perform these functions.

While the example embodiments illustrated show magnetic element 240 positioned on the body of paddle 230 in line with front face 230B of paddle 230 and the center of gravity of paddle 230, it will be appreciated that magnetic element 240 may be offset angularly from paddle 230 as desired. For example, magnetic element 240 may be positioned on an arm or other form of extension that is angled with respect to paddle 230 and connected to paddle 230 to rotate with paddle 230. For example, where two magnetic sensors 250A, 250B are used to collect time difference ΔT values, if magnetic element 240 is offset 90 degrees ahead of paddle 230, magnetic sensor 250A is positioned between about the "8 o'clock" position and about the "10 o'clock" position, such as at about the "9 o'clock" position, to detect when paddle 230 is at or near its lowest center of gravity where paddle 230 oscillates and magnetic sensor 250B is positioned between about the "5 o'clock" position and about the "7 o'clock" position, such as at about the "6 o'clock" position, to detect when paddle 230 begins to fall away from driving member 217. Similarly, where one magnetic sensor 250B is used to collect oscillation data, if magnetic element 240 is offset 180 degrees from paddle 230, magnetic sensor 250A is positioned between about the "11 o'clock" position and about the "1 o'clock" position, such as at about the "12 o'clock" position, to detect when paddle 230 is at or near its lowest center of gravity where paddle 230 oscillates. Further, while the examples discussed above sensing time difference ΔT values to determine the amount of toner 203 remaining in reservoir 202 use two magnetic sensors 250A, 250B to detect the motion of one magnetic element 240, it will be appreciated that time difference ΔT values may also be determined using a single magnetic sensor 250 to detect the motion of a pair of angularly offset magnetic elements 240. In this embodiment, one or both of the magnetic elements 240 may be positioned on an arm or extension connected to paddle 230 to rotate with paddle 230.

The shape, architecture and configuration of toner cartridge 200 shown in FIGS. 4 and 5 are meant to serve as examples and are not intended to be limiting. For instance, although the example image forming device discussed above includes a pair of mating replaceable units in the form of toner cartridge 200 and imaging unit 300, it will be appreciated that the replaceable unit(s) of the image forming device may employ any suitable configuration as desired. For example, in one embodiment, the main toner supply for the image forming device, toner adder roll 304, developer roll 306 and photoconductive drum 310 are housed in one replaceable unit. In another embodiment, the main toner supply for the image forming device, toner adder roll 304 and developer roll 306 are provided in a first replaceable unit and photoconductive drum 310 is provided in a second replaceable unit.

Although the example embodiments discussed above utilize a falling paddle in the reservoir of the toner cartridge, it will be appreciated that a falling paddle, such as paddle 230, having a magnetic element may be used to determine the toner level in any reservoir or sump storing toner in the image forming device such as, for example, a reservoir of the imaging unit or a storage area for waste toner. Further, although the example embodiments discussed above discuss a system for determining a toner level, it will be appreciated that this system and the methods discussed herein may be used to determine the level of a particulate material other than toner such as, for example, grain, seed, flour, sugar, salt, etc.

Although the examples above discuss the use of one or two magnetic sensors, it will be appreciated that more than two magnetic sensors may be used as desired in order to obtain more information regarding the movement of the falling paddle having the magnetic element. Further, while the examples discuss sensing a magnetic element using a magnetic sensor, in another embodiment, an inductive sensor, such as an eddy current sensor, or a capacitive sensor is used instead of a magnetic sensor. In this embodiment, the falling paddle includes an electrically conductive element detectable by the inductive or capacitive sensor. As discussed above with respect to magnetic element 240, the metallic element may be attached to the falling paddle by a friction fit, adhesive, fastener(s), etc. or the falling paddle may be composed of a metallic material or the metallic element may be positioned on an arm or extension that is rotatable with the falling paddle. In another alternative, the falling paddle includes a shaft that extends to an outer portion of body 204, such as through wall 206 or 207. An encoder wheel or other form of encoded device is attached or formed on the portion of the shaft of the falling paddle that is outside reservoir 202. A code reader, such as an infrared sensor, is positioned to sense the motion of the encoded device (and therefore the motion of the falling paddle) and in communication with controller 102 or another processor that analyzes the motion of the falling paddle in order to determine the amount of toner remaining in reservoir 202.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

What is claimed is:

1. A method for measuring a particulate material in a reservoir holding the particulate material, the method comprising:
   rotating a shaft positioned in the reservoir holding the particulate material;
   pushing by the rotation of the shaft a paddle mounted on the shaft and rotatable independent of the shaft;
   sensing a rotational motion of the paddle as the shaft rotates; and
   determining by a processor an amount of the particulate material remaining in the reservoir based on the sensed rotational motion of the paddle,
   wherein sensing the rotational motion of the paddle includes determining a number of times the paddle passes a point substantially at a lowest center of gravity of the paddle per revolution of the shaft.

2. The method of claim 1, wherein sensing the rotational motion of the paddle includes sensing a magnetic field of a magnetic element connected to the paddle by at least one magnetic sensor.

3. The method of claim 1, wherein sensing the rotational motion of the paddle includes sensing an electrically conductive element connected to the paddle by at least one of an inductive sensor and a capacitive sensor.

4. The method of claim 1, wherein determining the number of times the paddle passes the point substantially at the lowest center of gravity of the paddle per revolution of the shaft includes sensing the number of times the paddle passes a sensor positioned near the lowest center of gravity of the paddle.

5. The method of claim 1, further comprising determining that the reservoir is empty or near empty when the determined number of times the paddle passes the point substantially at the lowest center of gravity of the paddle per revolution of the shaft exceeds a predetermined amount.

6. A system for measuring a particulate material, the system comprising:
   a container having a reservoir for storing the particulate material;
   a rotatable shaft positioned within the reservoir;
   a paddle mounted on the shaft and rotatable independent of the shaft;
   a driving member that rotates with the shaft when the shaft rotates and that is positioned to push the paddle when the shaft rotates, the paddle being free to fall ahead of the driving member;
   at least one sensor positioned to sense a rotational motion of the paddle as the shaft rotates; and
   a processor in electronic communication with the at least one sensor and configured to determine an amount of the particulate material remaining in the reservoir based on the sensed rotational motion of the paddle,
   wherein the at least one sensor includes a sensor positioned to sense the paddle near a lowest center of gravity of the paddle and the processor is configured to determine a number of times the paddle passes the sensor per revolution of the shaft and to convert the determined number of times the paddle passes the sensor per revolution of the shaft to the amount of the particulate material remaining in the reservoir.

7. The system of claim 6, wherein the paddle includes a magnetic element having a magnetic field and rotatable with the paddle and the at least one sensor is a magnetic sensor positioned to sense the magnetic field of the magnetic element of the paddle during the rotational motion of the paddle.

8. The system of claim 6, wherein the paddle includes an electrically conductive element rotatable with the paddle and the at least one sensor includes at least one of an inductive sensor and a capacitive sensor positioned to sense the electrically conductive element of the paddle during the rotational motion of the paddle.

9. An electrophotographic image forming device, comprising:
   a replaceable unit having:
     a reservoir for storing toner;
     a rotatable shaft positioned within the reservoir;
     a paddle mounted on the shaft and rotatable independent of the shaft; and
     a driving member that rotates with the shaft when the shaft rotates and that is positioned to push the paddle when the shaft rotates, the paddle being free to fall ahead of the driving member;
   at least one sensor positioned to sense a rotational motion of the paddle as the shaft rotates; and
   a processor in electronic communication with the at least one sensor and configured to determine an amount of toner remaining in the reservoir based on the sensed rotational motion of the paddle,
   wherein the at least one sensor includes a sensor positioned to sense the paddle near a lowest center of gravity of the paddle and the processor is configured to determine a number of times the paddle passes the sensor per revolution of the shaft and to convert the determined number of times the paddle passes the sensor per revolution of the shaft to the amount of toner remaining in the reservoir.

10. The electrophotographic image forming device of claim 9, wherein the at least one sensor is mounted on the replaceable unit outside of the reservoir.

11. The electrophotographic image forming device of claim 9, wherein the paddle includes a magnetic element having a magnetic field and rotatable with the paddle and the at least one sensor is a magnetic sensor positioned to sense the magnetic field of the magnetic element of the paddle during the rotational motion of the paddle.

12. The electrophotographic image forming device of claim 9, wherein the paddle includes an electrically conductive element rotatable with the paddle and the at least one sensor includes at least one of an inductive sensor and a capacitive sensor positioned to sense the electrically conductive element of the paddle during the rotational motion of the paddle.

13. A method for measuring a particulate material in a reservoir holding the particulate material, the method comprising:
- rotating a shaft positioned in the reservoir holding the particulate material;
- pushing by the rotation of the shaft a paddle mounted on the shaft and rotatable independent of the shaft;
- sensing a rotational motion of the paddle as the shaft rotates; and
- determining by a processor an amount of the particulate material remaining in the reservoir based on the sensed rotational motion of the paddle,
- wherein sensing the rotational motion of the paddle includes sensing the presence of the paddle at a first point along the rotational path by a first sensor at a first time, sensing the presence of the paddle at a second point along the rotational path by a second sensor at a second time and determining a difference between the second time and the first time.

14. The method of claim 13, further comprising determining that the reservoir is empty or near empty when the determined difference between the second time and the first time falls below a predetermined amount.

15. A system for measuring a particulate material, the system comprising:
- a container having a reservoir for storing the particulate material;
- a rotatable shaft positioned within the reservoir;
- a paddle mounted on the shaft and rotatable independent of the shaft;
- a driving member that rotates with the shaft when the shaft rotates and that is positioned to push the paddle when the shaft rotates, the paddle being free to fall ahead of the driving member;
- at least one sensor positioned to sense a rotational motion of the paddle as the shaft rotates; and
- a processor in electronic communication with the at least one sensor and configured to determine an amount of the particulate material remaining in the reservoir based on the sensed rotational motion of the paddle,
- wherein the at least one sensor includes a first sensor and a second sensor spaced apart along a rotational path of the paddle and the processor is configured to determine an amount of time the paddle takes to travel between the first sensor and the second sensor and to convert the determined amount of time to the amount of the particulate material remaining in the reservoir.

16. The system of claim 15, wherein the first sensor is positioned to sense the paddle near a point where the paddle falls ahead of the driving member and the second sensor is positioned to sense the paddle near a lowest center of gravity of the paddle.

17. A system for measuring a particulate material, the system comprising:
- a container having a reservoir for storing the particulate material;
- a rotatable shaft positioned within the reservoir;
- a paddle mounted on the shaft and rotatable independent of the shaft;
- a driving member that rotates with the shaft when the shaft rotates and that is positioned to push the paddle when the shaft rotates, the paddle being free to fall ahead of the driving member;
- at least one sensor positioned to sense a rotational motion of the paddle as the shaft rotates; and
- a processor in electronic communication with the at least one sensor and configured to determine an amount of the particulate material remaining in the reservoir based on the sensed rotational motion of the paddle,
- wherein the at least one sensor includes a sensor positioned along a rotational path of the paddle to sense a first portion of the paddle and a second portion of the paddle spaced angularly from the first portion of the paddle and the processor is configured to determine an amount of time elapsed between a sensing of the first portion of the paddle and a sensing of the second portion of the paddle and to convert the determined amount of time to the amount of the particulate material remaining in the reservoir.

18. An electrophotographic image forming device, comprising:
- a replaceable unit having:
  - a reservoir for storing toner;
  - a rotatable shaft positioned within the reservoir;
  - a paddle mounted on the shaft and rotatable independent of the shaft; and
  - a driving member that rotates with the shaft when the shaft rotates and that is positioned to push the paddle when the shaft rotates, the paddle being free to fall ahead of the driving member;
- at least one sensor positioned to sense a rotational motion of the paddle as the shaft rotates; and
- a processor in electronic communication with the at least one sensor and configured to determine an amount of toner remaining in the reservoir based on the sensed rotational motion of the paddle,
- wherein the at least one sensor includes a first sensor and a second sensor spaced apart along a rotational path of the paddle and the processor is configured to determine an amount of time the paddle takes to travel between the first sensor and the second sensor and to convert the determined amount of time to the amount of toner remaining in the reservoir.

* * * * *